Patented Nov. 4, 1930

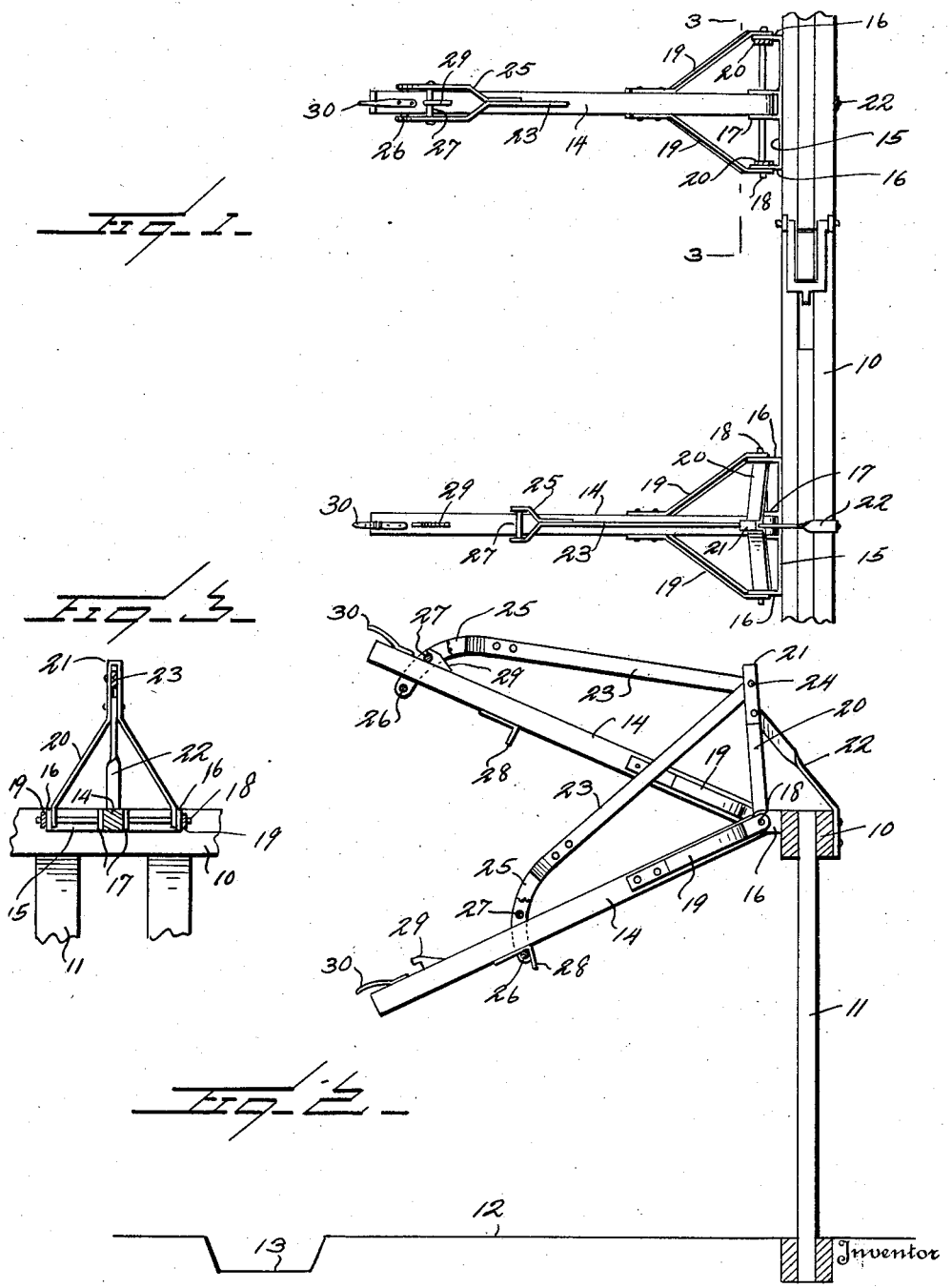

1,780,577

UNITED STATES PATENT OFFICE

EARL CARMAN, OF WALTON, NEW YORK

VERTICALLY-ADJUSTABLE PARTITION BAR FOR STABLES

Application filed September 19, 1929. Serial No. 393,746.

This invention relates to partitions used in stables for the purpose of separating animals and particularly to a construction employing a partition bar between each pair of animals. This partition bar is pivotally supported so that it may be swung down into a separating or operative position or swung upward into an out of the way position, the bar when swung up, permitting ready access to be had to the floor of the cow stalls for cleaning or for permitting the animals to move into or out of position, this invention being an improvement upon the construction illustrated, described and claimed in my pending application for patent, Serial No. 335,343, filed January 26, 1929.

In the construction shown in my prior application, the flexible connection is liable to break and the bar to drop and furthermore there is a constant tendency to chafe. An object of this invention, therefore, is to avoid these disadvantages.

Another object is to provide means readily attachable to any stanchion whereby the partition bar may be held raised or lowered and which will prevent accidental lifting of the partition bar by the cow or any other animal, this means being very simple, yet effective for the purpose intended.

My invention is illustrated in the accompanying drawings, wherein:—

Figure 1 is a top plan view of a stanchion with my improved partition bar applied thereto;

Figure 2 is a vertical sectional view through the stanchion showing one of the partition bars raised and the other lowered;

Figure 3 is a section on the line 3—3 of Figure 1.

Referring to these drawings, 10 designates the upper portion of a stanchion 11, 12 designating the floor of the cow barn and 13 the usual gutter.

Mounted upon the upper end of the stanchion is the partition bar 14 which may be made of wood or any other suitable material and have any desired length. This partition bar is preferably supported as follows.

Mounted upon the upper end 10 of the stanchion is a strap iron 15 having its ends outwardly bent to form ears 16. Mounted upon this strap iron 15 is a U-shaped supporting member 17 apertured for the passage of a pintle 18 which holds the partition bar 14 pivotally supported upon the ears. This partition bar 14 is provided preferably with laterally extending braces 19 bolted, riveted or otherwise attached to the partition bar and extending rearward divergently to the exterior of the ears 16 and connected thereto by means of the pivot bolt 18 previously referred to which extends through these ears 16 and also through the hinge member 17 and through the bar 14.

Mounted upon the pintle 18 and extending upward therefrom is the approximately V-shaped yoke 20, the upper end of which is contracted as at 21.

A brace 22 is riveted, bolted or otherwise attached to this yoke below the upper end thereof and extends downward and rearward on to the rear face of the stanchion 10 and is held thereto by screws, bolts or any other suitable fastening devices. Thus the yoke is held rigidly from any movement. Pivotally disposed within the contracted upper end of the yoke 21 is a latch bar 23 which is pivoted at 24 and whose outer or free end is bifurcated and downwardly curved as at 25. Extending through this fork 25 are the two bolts or transverse members 26 and 27 which are spaced apart a sufficient distance to permit the partition bar 14 to be inserted between these bolts and slide freely therein.

Mounted upon the partition bar rearward of its free end is a downwardly extending hook or detent 28 while upon the upper face of the partition bar, there is applied a forwardly extending hook or detent 29. The extreme free end of the partition bar preferably carries upon it a cow tail holder formed of a strip of metal 30 attached to the upper face of the partition bar and extending upward and outward therefrom.

The operation of this device will be obvious from the drawings. When it is desired to dispose the partition bar out of the way, the partition bar is raised by hand. The upper face of the partition bar bears against the bolt 27 and as the partition bar is raised, the holding member 23 will swing upward, the bolt 27 sliding along the upper face of the partition bar 14 until it passes over the hook 29. Then if the partition bar be lowered a trifle, the hook or detent 29 will engage against or slightly over the bolt 27.

Under these circumstances, the partition bar is held raised entirely out of the way so that the cow or other animal can easily get out of the stall formed by adjacent partition bars or get in on the floor of the cow stable and the stanchions may be thoroughly cleaned. When it is desired to lower the partition bar, it is only necessary to push upon the latch bar 23 and then let the partition bar move downward to the position shown in Figure 2. It will be seen that the movement of the partition bar is very easy and that when the partition bar is raised upward, it will automatically lock and that when the latch bar 23 is lifted slightly, the partition bar may then be allowed to drop when it will automatically engage against the hook 28 and latch in its lowered position.

The detents or hooks 28 and 29 will be placed upon the partition bar in accordance with the height of the stanchion, the height of the stable, etc. Preferably, these partition bars will be used in cow stables housing a number of cows and preferably each bar will be mounted upon its individual bracket or support 15. Any of the partition bars, of course, may be raised independently of any other. Thus space for two cows may be enclosed as one space. All of the partition bars may be raised for cleaning or only those bars may be lowered which define cow stalls, the remaining bars being raised so as to leave this portion of the floor space unencumbered.

The usual pipe partitions found in cow barns are installed in the concrete or supported on the floor and remain as erected during the first few years of their life, but these iron pipe partitions are very liable to rust out because of the presence of ammonia and stable acids and so the partitions become loose and worthless.

Cows rub against the partitions and this tends to loosen them in their foundations and bend the pipe. My partition bar being supported above the floor, there are no floor bearings to become saturated or decayed. The floor is entirely unencumbered so that thorough cleaning and sweeping can take place. Where a stationary type of partition is used, the cow must back out to turn around in the driveway, but with these pivoted partitions, they permit the cows when the partitions are lifted to turn without backing. This avoids confusion and accidents as in returning from a barnyard, it often happens that a cow gets in the wrong stanchion, with the rightful occupant crowding to get in place and the transgressor trying to get out and the result is inevitable if the floor happens to be wet with tracked-in snow. In case a cow is taken sick and gets down on the floor, the existing type of partition is in the way and cumbersome to work around while the movable partition bar can be easily swung up out of the way in any emergency, as for instance, when the cows are being cleaned or at milking time. At milking time, the tail of the cow may be engaged, of course, with the cow tail holder 30 which prevents the cow from switching her tail into the pail of milk and against the face of the milker.

While I have illustrated certain details of construction and arrangement of parts, I do not wish to be limited thereto and many minor changes might be made without departing from the spirit of the invention as defined in the appended claims.

I claim:—

1. In combination with a cow stall, a partition bar pivotally engaged with the cow stall for vertical movement, and means whereby it may be held in a raised or lowered position, said means including a latch bar pivotally supported at one end and at its other end slidingly engaging the partition bar, the free end of the latch bar having upper and lower transversely extending members between which the partition bar slides, and the partition bar having a detent disposed adjacent its free end and a detent disposed inward of the first-named detent respectively engageable with the transversely extending members of the latch bar.

2. The combination with a structure having a vertical wall or equivalent element, of a movable partition bar pivotally mounted upon said wall for vertical movement, the partition bar adjacent its free end having an outwardly and upwardly extending detent upon its upper face and inward of said detent and upon its lower face being provided with a downwardly extending detent, a latch bar pivotally supported at one end and at its other end having a fork between which the partition bar operates, and transverse bolts extending through said fork above and below the partition bar and normally spaced therefrom, said bolts being respectively engageable with the upper detent or the lower detent on the partition bar when the partition bar is respectively raised or lowered.

3. The combination with a structure having a stanchion, of a yoke extending upward from the stanchion, and braced rigidly therefrom, a partition bar pivotally mounted below said yoke and operatively pivoted upon the stanchion for movement in a vertical plane, the partition bar adjacent its ends being formed with an upwardly extending detent on its upper face and inward of the first named detent and on its lower face with a downwardly extending detent, and a latch bar pivoted upon the upper end of said yoke and extending downward and formed to provide an aperture through which the partition bar slidingly moves, the upper and lower wall defining said aperture being respectively engageable with the upper and lower detents when the bar is respectively raised or lowered.

4. A movable partition for animal stalls comprising a bracket, a partition bar pivoted to said bracket intermediate its ends and having an upwardly extending detent upon its upper face adjacent the free end of the bar and a downwardly extending detent on its lower face inward of the first named detent, a yoke mounted upon said bracket and extending upward therefrom and a latch bar pivoted upon the upper end of said yoke and extending downward and at its free end formed to provide a fork through which the partition bar slidingly passes, the fork being traversed by two members disposed respectively above and below the partition bar and engageable respectively with said detents, when the partition bar is raised and when it is lowered.

In testimony whereof I hereunto affix my signature.

EARL CARMAN.